J. R. KELLY.
COMBINED RAKE AND FORK.
APPLICATION FILED JUNE 5, 1912.
1,062,241.
Patented May 20, 1913.
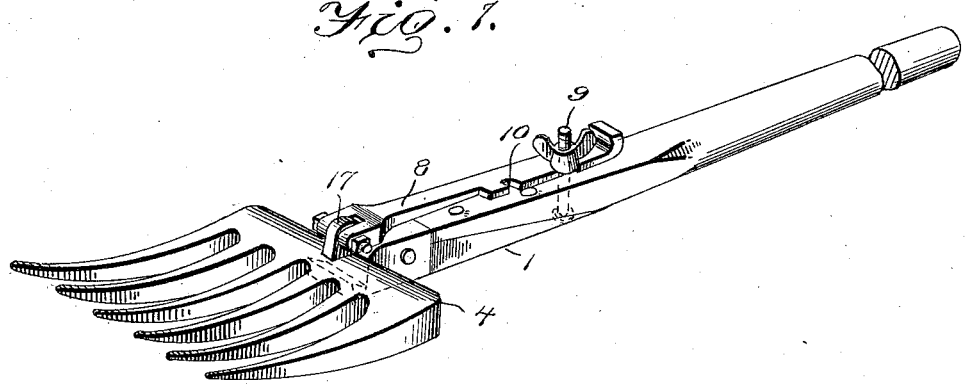
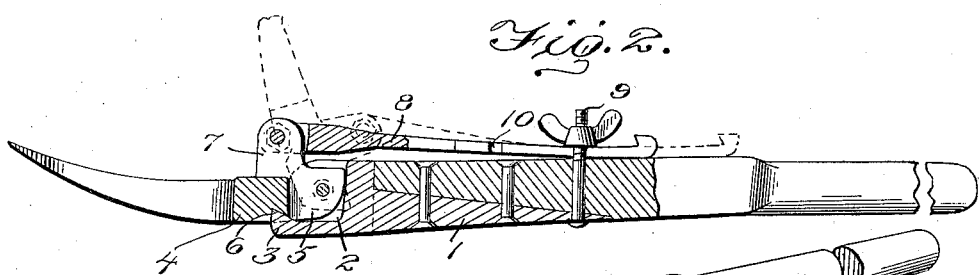
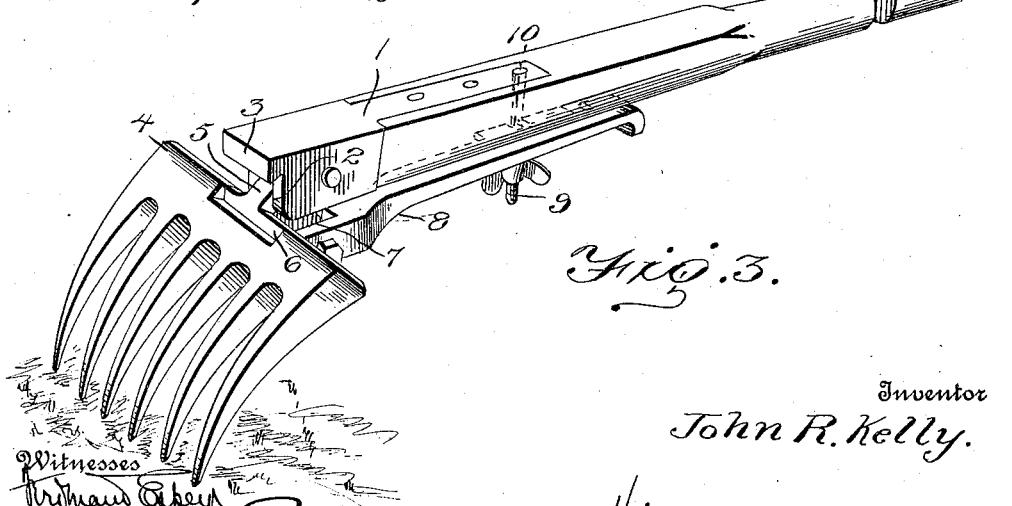
Inventor
John R. Kelly.

UNITED STATES PATENT OFFICE.

JOHN R. KELLY, OF CHAPIN, SOUTH CAROLINA.

COMBINED RAKE AND FORK.

1,062,241.  Specification of Letters Patent.  Patented May 20, 1913.

Application filed June 5, 1912. Serial No. 701,850.

*To all whom it may concern:*

Be it known that I, JOHN R. KELLY, citizen of the United States, residing at Chapin, in the county of Lexington and State of South Carolina, have invented certain new and useful Improvements in Combined Rakes and Forks, of which the following is a specification.

This invention has relation to combined rake and fork structures and has for its object to provide a simple and durable device which may be easily and quickly transformed from a rake to a fork, and vice versa.

In the drawings: Figure 1 is a perspective view of the device with the parts arranged as a fork; Fig. 2 is a sectional view of the same; Fig. 3 is a perspective view of the device with the parts arranged as a rake.

Corresponding and like parts are referred to in the following description and indicated in all the views of the accompanying drawings by the same reference characters.

The device consists of a head 1 which is adapted to be attached to a handle in any suitable manner. This head is provided with a recess 2, and a projecting lug portion 3. A rake head 4 is provided with a shank 5 which is pivoted in the recess 2, and the said rake head 4 is provided with a recess 6 which at times is adapted to receive the end portion of the lug 3. The rake head 4 is further provided with a lug 7. A bar 8 is pivotally connected with the lug 7 and is adapted to be adjustably connected with the handle of the device by means of a bolt 9 which may be passed through any one of the openings 10 provided upon the bar 8, and also passed through the handle of the device.

From the above description it will be seen that when the bar 8 is moved up along the handle of the device and secured, the rake head 4 will be swung to a position approximately at a right angle to the long dimension of the head 1. When the parts are so positioned the device may be used as a rake. When the bar 8 is moved down along the handle of the device and secured the rake head 4 is swung to a position approximately in alinement with the long dimension of the head 1, and the parts are positioned so that the device may be easily and conveniently used as a fork. When the parts are positioned as last above indicated the recess 6 at the back of the rake head 4 will receive the lug portion 3 of the head 1, and therefore the head 4 is securely braced in its position upon the head 1 when the device is transformed into a fork.

Having described my invention, what is claimed as new is:

1. A combined fork and rake comprising a head having at its end a transverse projecting lug portion, a rake member pivoted to the head and having a transverse recess in one face adjacent its edge adapted to receive the lug portion, and a locking bar pivoted to the rake member and adapted to be adjusted with relation to the head.

2. A combined fork and rake comprising a head having a recess and a projecting lug portion, a rake member having a shank pivoted in the recess of the head and provided with a recess adapted to receive the lug portion of the head, said rake member also having a lug, and a locking bar pivotally connected with the lug.

3. A combined fork and rake comprising a head having a recess and a projecting lug portion, a rake member having a shank pivoted in the recess of the head, said rake member being provided at its side with a recess adapted to receive the lug upon the head, said rake member also having a lug disposed approximately at a right angle to the shank, a bar pivoted to the rake member, and means for securing the bar at an adjusted position with relation to the head.

In testimony whereof I affix my signature in presence of two witnesses.

JOHN R. KELLY. [L. S.]

Witnesses:
  A. B. SUMMER,
  H. J. QUATTLEBAUM.

Copies of this patent may be obtained for five cents each, by addressing the "Commissioner of Patents Washington, D. C."